(No Model.)
J. J. GILL.
Glass Melting Furnace.
No. 239,763. Patented April 5, 1881.
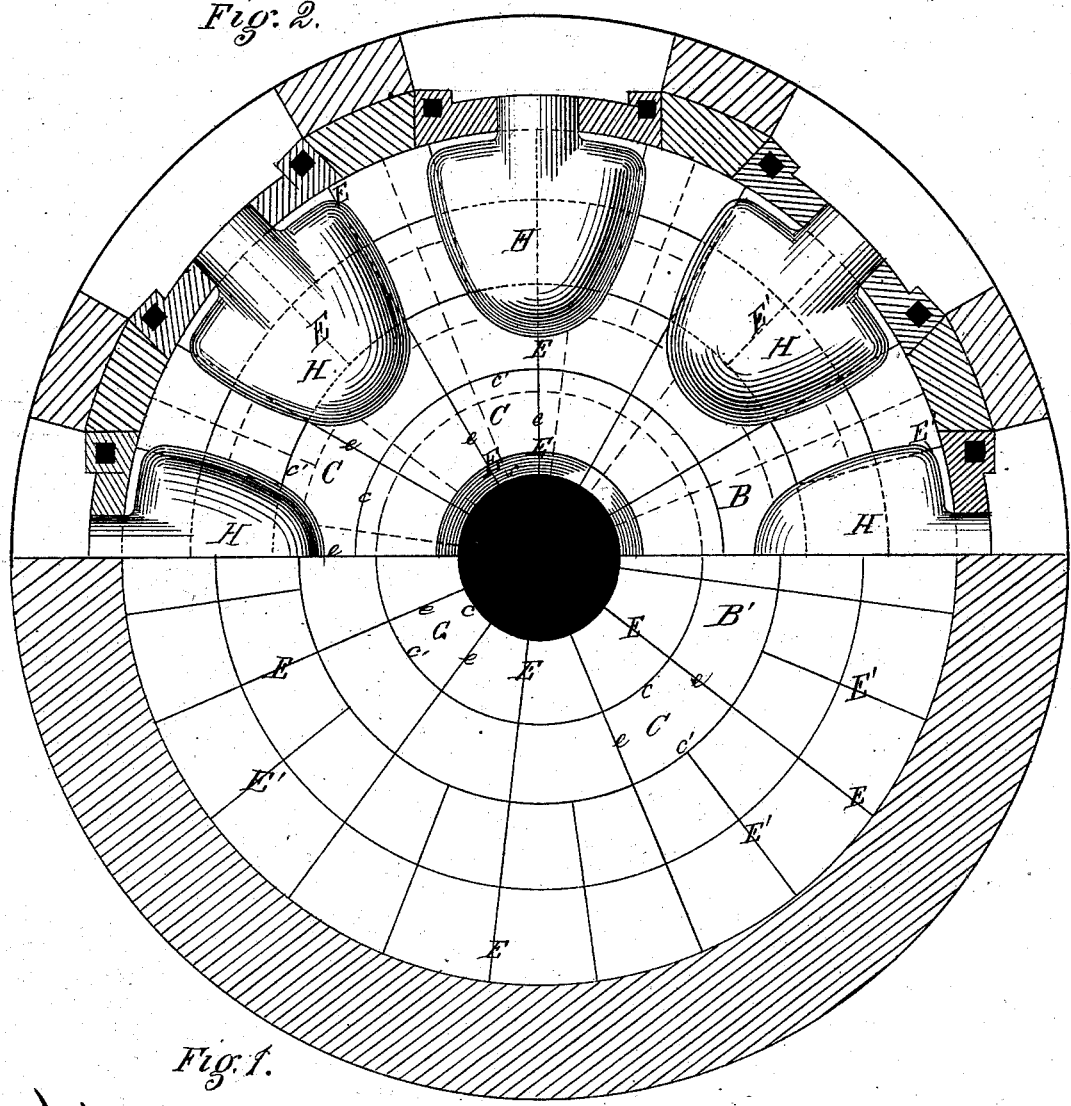

UNITED STATES PATENT OFFICE.

JOSEPH J. GILL, OF STEUBENVILLE, OHIO.

GLASS-MELTING FURNACE.

SPECIFICATION forming part of Letters Patent No. 239,763, dated April 5, 1881.

Application filed March 3, 1881. (No model.)

*To all whom it may concern:*

Be it known that I, JOSEPH JOHN GILL, of Steubenville, county of Jefferson, State of Ohio, have invented or discovered a new and useful Improvement in Glass-Melting Furnaces; and I do hereby declare the following to be a full, clear, concise, and exact description thereof, reference being had to the accompanying drawings, making a part of this specification, in which—like letters indicating like parts—

Figure 1 is a top-plan view of the siege or bench of a glass-melting furnace illustrative of my invention, and Fig. 2 is a vertical sectional elevation of the same.

My invention relates to the construction of the siege or bench of a glass-melting furnace, or that part of the furnace which forms the floor of the melting-chamber, and on which the pots rest or are supported. The usual form of such bench is a circular table, around the periphery of which the pots are placed, and at the center of which an opening or eye is formed for admitting heat from the combustion-chamber to the melting-chamber.

Heretofore this bench or siege has been faced either with fire-brick of the ordinary rectangular form, which were disposed in any desired number of layers or courses, with joints in all directions, or with a layer of fire-clay or similar refractory material, worked while plastic into one continuous bed of greater or less depth. A very high degree of heat is maintained in the melting-chamber of such a furnace—much greater than is ever in practice secured in manufacturing fire brick or tile. As a consequence the brick shrink more or less in use, no matter how tightly or well they may be laid in constructing the bench, resulting in opening a great many seams and joints in all directions through the body of brick-work. This shrinkage is even more marked in a continuous clay bench, because the clay must be worked in moist or green, and has not the benefit of a previous burning. The cracks and seams are consequently much larger, and they also branch or ramify most irregularly in all possible directions.

A frequent and serious difficulty which is always encountered in glass-melting is the breaking and leaking of pots, and when molten glass is thus let out onto the surface of the bench it percolates between bricks or finds its way through the seams and openings in the bench above described, its course often being so tortuous that the escaping glass reaches the eye on a different side from that occupied by the broken pot, so that it is often extremely difficult to determine from the flow of glass which pot is broken. Moreover, this winding course involves much delay, and hence a large flow of glass from the broken pot into the seams of the bench before any of it reaches the eye. If the broken pot could be determined at once, a large part of its contents might be saved; but heretofore this could not be done in many cases, and not only was the glass lost, which is a considerable item, but also the bench is always very greatly injured by the glass which percolates through it, this being the prime source of the necessity for frequent repairs. Another very grave difficulty arising from the flow of glass, especially in gas-furnaces, is the danger of stopping or closing up the air ports or flues located under the bench and in and about the eye.

The purpose of my invention is to provide in the construction of the bench radial ways or conduits which will give uninterrupted and secure passage for melted glass from the pots directly to the eye, and thereby prevent the tendency of the glass to percolate through the body of masonry, and also cause it to serve as a reliable and early index to the location of the broken pot. Also, by an orderly arrangement and form of bricks or tile employed, I lessen the number and extent of seams exposed to the flow of glass, and thereby lessen the danger of injury to the bench.

My improved bench is constructed as follows:

A suitable bed or foundation, A, is built for the bench, of the usual or any desired form and materials, having the usual eye, A', at the center, and walls and dome surrounding and inclosing the same. The fire-chamber of the furnace may be built and connected with the eye in any desired or suitable way, with a view to generating and maintaining the desired degree of heat. Upon the upper surface of the bed A, I lay two or more courses, B B', of fire-clay tile, which are formed and arranged as follows: Each tile or brick C is, by preference, segmental in form. The top and bottom faces are plane and parallel. The inner and outer edges, c c', are formed in arcs of circles, all of which have a common center in the eye, when the bench is of the usual circular form, and the side edges, e e, have a radial inclination or direction with relation to the arc edges c c'. These tile are arranged on the bench in annular order, or in a succession of concentric rings, as shown, and their position and circumferential length or extent are so adjusted throughout the several rings that the radial edges e register or coincide and unite in forming continuous lines of joints E, extending from the eye to, or nearly to, the periphery of the bench. The number of such radial coinciding joints E may be varied as desired, though I prefer to provide two such lines, or more, for each pot H, and arrange them to pass under the pots, as shown in Fig. 1.

In order that all the tile may be of convenient size for handling, those intended for the outer rings may be subdivided so as to form one or more short lines of joints, E', between the lines E, the short joints extending part way in toward the eye.

All the tile of each layer B B' should be of equal thickness, especially in the under layer, B', and they are so arranged that the tile of one layer shall break or cover the joints of the other layer. This arrangement is shown with respect to the arc-joints in Fig. 2, and illustrated in Fig. 1 for both arc and radial joints, such joints in the upper course, B, being shown on one half the bench, in full lines, except where covered by the pots H, and the joints of the under course, B', being shown by dotted lines on the same half and in full lines on the uncovered half of the bench. A double floor of refractory tile is thus formed, in which the lower layer, B', forms a bed for the upper, B, practically seamless, since the only openings exposed to the lines E of the upper layer are at the points—few in number—where the lines E cross the arc-lines below. Owing to the protection from heat of the lower layer, these openings at the crossing points will be small, so that practically continuous uninterrupted passage-ways will be formed along the lines E, along which escaping glass may flow quickly and directly to the eye without serious injury to the bench.

It is obvious that the point at which the glass thus escapes into the eye will be a reliable indication to the workmen which pot is broken. If this knowledge is quickly obtained, the greater part of the contents of such pot can usually be saved, thus preventing a serious loss which has heretofore been of frequent occurrence in glass-manufacture.

It will also be observed that the arc-joints under and near the pots will direct the escaping glass directly to the radial joints E, and the glass flowing readily along these latter joints in the upper course or layer, the danger of injury to the bench will be almost entirely obviated. This is also a matter of great importance practically, not only on account of the expense of making the needed repairs, but also the danger incurred in cooling down the pots while repairing an injured bench is a very serious one.

So far as I am aware no such provision has heretofore been made as I have herein described for carrying escaping glass directly to the eye by practically unobstructed radial ways or conduits secured by the form and arrangement of the tile or brick, and in applying this feature of my invention I do not wish to limit it strictly to straight ways or conduits, as the same may be curved or deflected somewhat and still afford practically uninterrupted passage from the pots to the eye. Neither do I wish to limit my invention to circular benches, as it may be applied with equal advantage and in substantially the same way in benches of other forms, though the circular bench is usually employed in glass-houses, and for ease of construction and regularity of form, both of the bench as a whole and of the separate tile C, I prefer the circular form described.

I claim herein as my invention—

1. In a glass-melting furnace, a bench or siege having on its upper surface a layer of tile arranged with their side edges in continuous lines, some or all of which extend from the eye outward to the position of the pots, substantially as and for the purposes set forth.

2. In the bench of a glass-melting furnace, an upper surface layer, B, of segmental-shaped tile C, arranged with their side edges, e, in continuous radial lines from the position of the pots to the eye, in combination with an under layer, B', of similar-shaped tile, arranged to break or cover the radial joints of the upper layer, substantially as set forth.

3. In the bench of a glass-melting furnace, the combination of two layers or courses, B B', of tile, the joints of one layer being covered or broken by the tile of the other layer, the several tiles of each layer being of segmental form, having curved inner and outer edges, c c', and radially-inclined side edges, e, such tile being arranged in concentric rings, with continuous lines of joints E along the edges e, extending from the eye out to the position of the pots, substantially as set forth.

In testimony whereof I have hereunto set my hand.

JOSEPH J. GILL.

Witnesses:
R. H. WHITTLESEY,
C. L. PARKER.